Patented Apr. 19, 1938

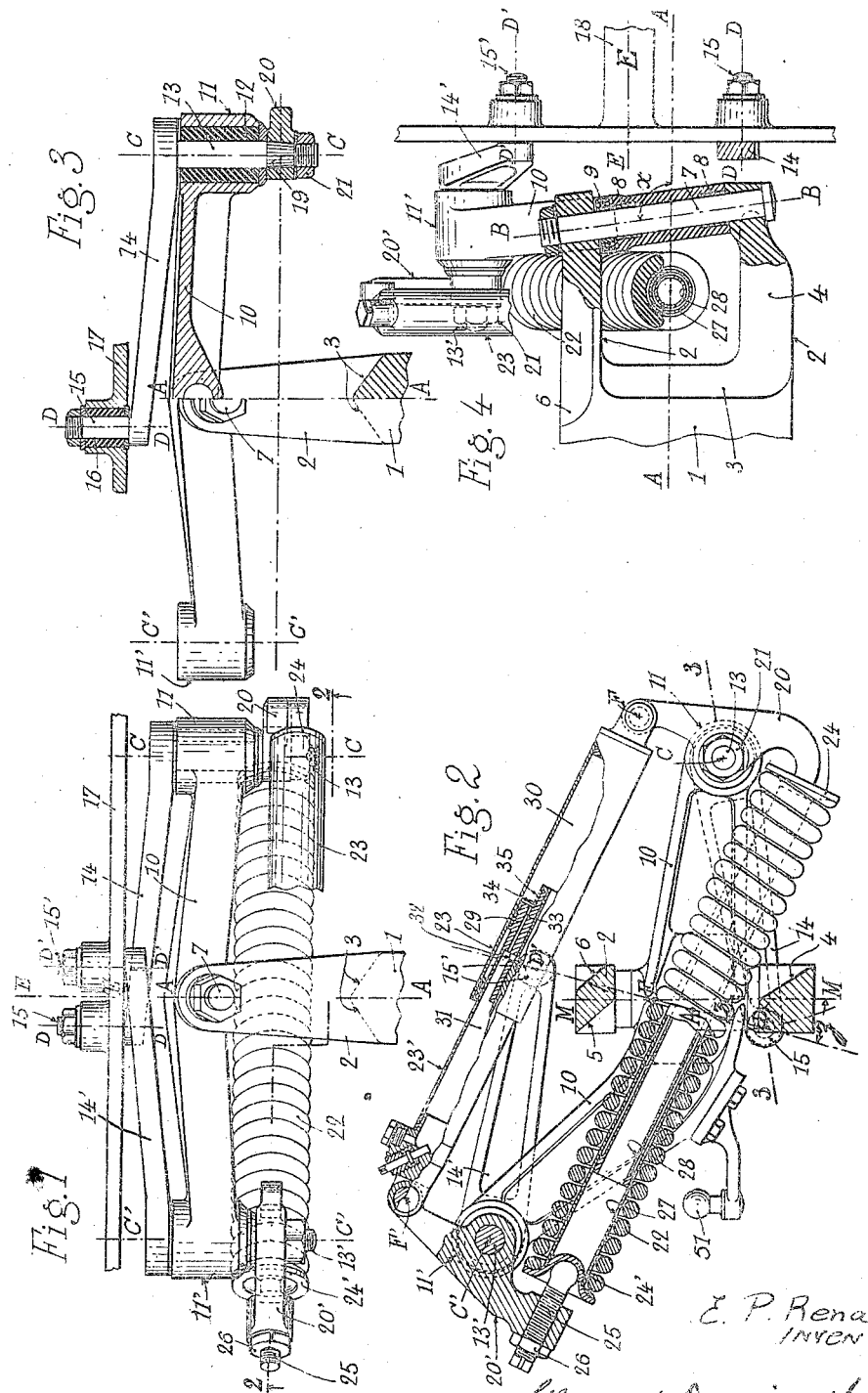

2,114,571

UNITED STATES PATENT OFFICE 2,114,571

SUSPENSION FOR VEHICLES

Eugène Prosper Renaux, Paris, France

Application May 10, 1935, Serial No. 20,863
In France May 16, 1934

2 Claims. (Cl. 280—96.2)

The present invention has for its object a suspension for vehicles, with independent wheels, which offers all the advantages sought for by this system, without any fragile parts or complicated controls, and is free from the defects inherent in the known devices.

In conformity with the invention, the disc of the wheel, or equivalent part, is pivoted to two arms, which are connected together by a spring and are pivoted, directly or not, to the chassis of the vehicle.

According to one method of execution, the two arms are mounted in such manner that the spring which joins these latter is simply placed loosely between them, and operated by compression during the upward movements of the wheel with reference to the chassis.

In the case of a steering wheel, the two arms are pivoted to a member which is pivotally mounted on the chassis or on a vehicle axle or equivalent part, which is rigidly secured to the said chassis.

Preferably, in the case in which the suspension comprises an axle, this latter is secured to the chassis in a position which is fixed but which may be angularly adjusted about the longitudinal axis of the said axle.

Further characteristics, as well as the advantages obtained, will be set forth in the following description.

In the accompanying drawings, which are given solely by way of example:

Fig. 1 is a plan view of the suspension, according to the invention, of a vehicle wheel.

Fig. 2 is a vertical section of the same, on the line 2—2 of Fig. 1.

Fig. 3 is a partial view of the same, in horizontal section on the line 3—3 of Fig. 2.

Fig. 4 is a corresponding front view, with parts broken away.

Figure 5:
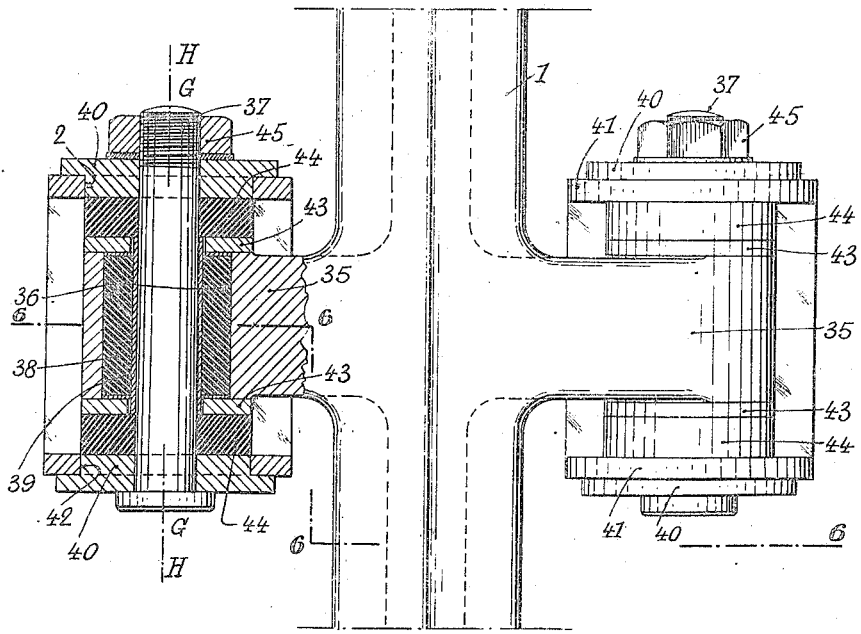
Fig. 5 is a plan view, partly in section on the line 5—5 of Fig. 6, of a method for the adjustable securing of the axle.

According to the example of execution represented, relating to a set of front steering wheels for a motor vehicle, the suspension comprises an axle 1 which is common to the two wheels and is rigidly secured to the chassis, preferably by an adjustable device such as the one which will be further described, which permits to adjust the inclination with reference to a vertical plane, and about the longitudinal axis A—A of the longitudinal plane M—M of symmetry of this axle (Fig. 2).

The axle 1, which is supposed to be common to the two wheels, might be replaced by two independent half-axles which are secured to the chassis in like conditions, or by any other equivalent fixed parts.

For each wheel, the axle 1 or like part has at the end a forked bracket 2. The inner end of said bracket 2 is preferably cut on a double bevel 3, in order to increase the maximum possible angle of steering of the wheels. In like manner, the inner faces of the prongs of the fork are preferably provided, for the lower prong, with a bevel 4 (Figs. 2 and 4) directed towards the front, and for the upper prong, with two bevels 5 and 6, whereof one is in the interior and is directed towards the rear, and the other is at the exterior and is directed towards the front.

The fork 2 carries an axle-pin 7 whose axis is B—B (Fig. 4), inclined in the transverse plane of symmetry M—M of the axle.

The transverse inclination $x$ (Fig. 4) of the axis B—B is such that its downward extension will pass, for instance, either through the point of contact of the wheel (not shown) with the ground, if the axis B—B has no inclination, that is, if it is not inclined from rear to front and from top to bottom, or in front of the said point of contact of the wheel with the ground, if the axis B—B has a positive inclination.

Upon the axle-pin 7, and by means of rings 8 and of a ball bearing 9 (Fig. 4) is loosely mounted, near its middle part, a member 10. This member 10, which is intended to serve as a support for the wheel, carries the ball-headed piece 51 (Fig. 2) to which the steering link is secured.

The two supporting pieces 10 for the two front wheels are connected in the known manner by a steering link which permits to adjust their relative position and thus to regulate the slight convergence of the planes of the two wheels towards the front.

Each piece 10 is terminated by two eyes 11—11′, in which are caused to turn, through the medium (preferably) of rings 12 (Fig. 3) of india-rubber radially compressed, the axle-pins 13—13′ having the respective axes C—C and C′—C′, and secured to respective arms 14—14′.

The two arms 14—14′ carry at their other ends the axle-pins 15—15′ whose respective axes are D—D and D′—D′, these axle-pins being mounted loose, and preferably by means of elastic rings 16 (Fig. 3), in the disc of the wheel 17. The pivot axes D—D and D′—D′ of the arms 14 and 14′ on the disc 17 of the wheel are situated on either side of and at equal distances from the axis E—E common to the disc 17 and the journal 18 of the wheel.

The plane D—D' (Fig. 2) determined by the axes D—D and D'—D' may make, in its mean position, a certain angle $z$ with the aforesaid fixed plane M—M of the vehicle axle.

The axle-pins 13 and 13' for the pivoting of the arms 14—14' upon the supporting piece 10 extend outwardly of the eyes 11 and 11'. To their ends are secured, for instance by the use of striated parts or grooves 19, the levers 20—20' which are maintained by nuts 21.

The levers 20—20' are pivoted at their middle parts. Two of their ends which are oppositely situated are connected together by a spring 22, and their two other ends are connected together by a shock-absorbing device 23—23'.

The spring 22, of helical form, which is adapted to operate by compression, is pressed between two discs 24 and 24' which bear upon the levers 20 and 20', the first disc 24 bearing directly, and the second 24' by means of an adjusting threaded rod 25, which can be held in position by a nut 26. The spring 22 is preferably guided by a telescoping tubular device 27—28, bearing upon the discs 24—24'.

As concerns the shock-absorbing device 23, this may be of any type, hydraulic or other, and single-acting; this device provides for the free separation of its ends F—F' (Fig. 2) but impedes their approaching movement. The device represented is of a known hydraulic type, having a piston 29 which is secured to a tube 23' pivoted at F' to the lever 20', whilst the cylinder 23 in which the piston 29 is movable, is pivoted at F to the other lever 20. The communication between the chambers 30 and 31 formed between the two cylinders is ensured when the points F and F' become separated, by an orifice 32 and by one or more additional orifices 33 provided in the piston 29. The discharge of the fluid is not impeded. On the contrary, when the two points F and F' come nearer together, the oil or other liquid being now obliged to flow from the chamber 30 to the chamber 31, the additional orifice or orifices 33 are closed by a valve 34 subjected to the action of a spring 35, and thus the discharge of the liquid is impeded.

The operation is as follows. Let it be supposed that the vehicle is loaded and is in its mean position. The system is then in the position represented. The spring 22 is partly compressed by the levers 20 and 20', and the axes D—D and D'—D' are in such position that the axis of the wheel journal is at E (Fig. 2). When the wheel is vertically displaced with reference to the chassis, for instance upwardly, due to its passage over an obstacle, for example, the axes E—E and D, D' will move with the wheel, and the arms 14—14' will pivot about the axes C—C and C'—C'. Due to the pivoting of the arms 14—14', if the wheel moves upwardly, the lower ends of the levers 20 and 20' will approach each other, thus compressing the spring 22 which impedes the motion of the wheel; at this time the shock-absorber 23—23' does not act, since the axes F and F' move apart. When the obstacle is cleared, the spring 22 expands and brings the wheel to its initial position, and this return is impeded by the shock-absorber 23—23', since the axes F and F' approach each other.

During the vertical movements of the wheel, the axes D—D and D'—D' describe portions of cylinders whose axes coincide with the axes C—C and C'—C'. The plane D—D' passing through these axes D—D and D'—D' and through the axis E—E of the journal will thus oscillate about this axis E—E, but this is no drawback. In fact, as the wheel is loose on the journal 18, this oscillation varies the speed of rotation of the wheel with reference to the journal.

On the contrary, and this is important, the axis E of the wheel will move perpendicularly to the ground on a rectilinear path according to the plane M—M. The wheel-base, that is, the distance between the points of contact of the front wheel and the corresponding rear wheel thus will remain constant during the vertical movements of the front wheel.

The suspension herein described offers numerous advantages.

It should be noted in the first place that the vertical positions of the wheels with reference to the chassis of the vehicle have no effect:

Upon the gauge, the distance between the points of contact of the two wheels,

Upon the wheel-base, due to the rectilinear displacement according to M—M,

Upon the set of the journals of the wheels,

Upon the convergence (convergence of the wheels), since these values depend exclusively upon the relative positions of the members 10 and upon their position with reference to the vehicle axle, Upon the wheel-spin, which is invariable.

The shocks due to the irregularities of the road have no lateral reaction upon the frame.

The steering diagram is invariable, with the use of a standard steering system, without any of the complicated controls which are generally found in the systems of independent wheels.

The suspension herein described has also the advantages which are due to its simple construction and to its lightness; a great responsiveness of the suspension and a flexibility which is practically constant, owing to the length of the spring 22 and to the ratio of the lever arms 14 and 20 acting upon the spring.

On the other hand, it has no fragile parts, and the vehicle axle 1 (or the aggregate) to which it is secured is not subject to any effects of torsion due to the vertical movements of the wheel, the stresses being equally distributed on the two arms 14 and 14' which are mounted on either side of the said axle.

The non-suspended weight is greatly reduced, as all the rod-and-link gear for the steering is itself suspended.

Figure 6:
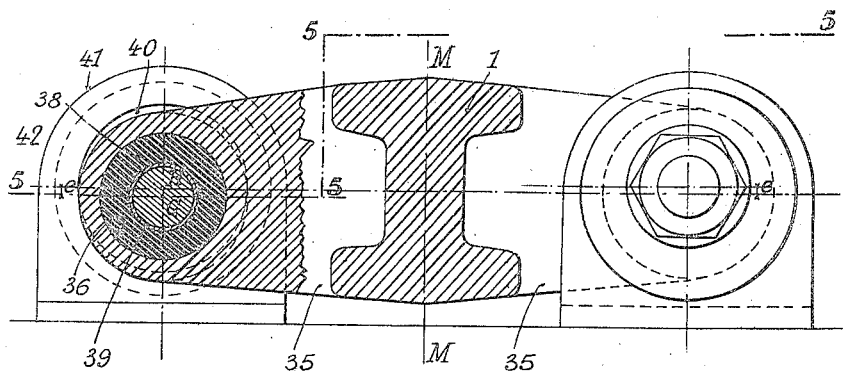
Fig. 6 is a vertical section on the line 6—6 of Fig. 5.

Figs. 5 and 6 represent a method for securing the axle 1, permitting to adjust the inclination, with reference to a vertical plane of the longitudinal plane of symmetry M—M of the said axle, and hence the inclination, with reference to a vertical transverse plane, of the pivoting axis B—B of the member 10.

In this example of execution, not far from each end, the axle 1 carries two oppositely-situated lateral lugs 35, each of which forms an eye 36, this being traversed by a bolt 37 whose axis is G—G. A ring 38 of elastic material is radially compressed between the bore 36 of the eye and a metallic sleeve 39 placed over the bolt 37. The said bolt 37 traverses two discs 40, fitted into a fork 41, adapted to be secured on the chassis. The cylindrical seatings 42 of the discs 40 are coaxial, but their common axis H—H is made eccentric by a certain quantity $e$ with reference to the axis G—G of the eye 36 and of the bolt 37.

The vehicle axle 1 is held, in the longitudinal direction, due to the contact between each of its eyes 36 and the internal faces of the corresponding fork 41, and preferably through the intermediary of metallic washers 43 and washers 44 of india rubber or like elastic material.

The whole device is maintained by the bolt 37 and its nut 45.

It will be observed that it is simply necessary to turn the discs 40 upon their seatings 42 in order to displace the axis G—G with reference to the fixed axis H—H; the axis G—G may be located at any point on a cylinder whose radius is equal to the eccentricity $e$ between the axes G—G and H—H.

By a suitable choice of the angular positions of the discs 40 relatively to the two eyes 36, one may thus adjust the position, with reference to the horizontal, of the plane determined by the two axes G—G, and hence the angular position, with reference to a vertical plane, of the plane of symmetry M—M of the axle.

Obviously, the invention is not limited to the methods of execution herein represented and described, which are given solely by way of example.

Having now described my invention what I claim as new and desire to secure by Letters Patent is:

1. In combination, a chassis for a vehicle, a steering king pin on said chassis and a bracket rotatably mounted on said steering king pin and extending towards the front and the rear of said king pin, a wheel support provided with a journal which is adapted to support a wheel rotatably, two arms pivoted at one of their ends on said wheel support respectively at two points disposed symmetrically with relation to said journal and at their other ends respectively on the portions of said bracket extending towards the front and the rear of said king pin, the lengths of said arms and the relative distances between their attaching points on said wheel support and on said bracket being chosen in such manner that said journal of said wheel support is only movable in a substantial vertical direction, and spring means adapted to oppose the vertical relative displacement of said wheel support with respect to said chassis in at least one direction.

2. In combination, a chassis for a vehicle, a wheel support provided with a journal which is adapted to support a wheel rotatably, two arms pivoted at one of their ends on said wheel support at two points disposed symmetrically with relation to said journal, two pivots disposed respectively in front and at the rear of said journal and about which the other ends of said arms are adapted to pivot, means for connecting operatively said pivots to said chassis, a lever secured on each of said arms at the end pivoted on the corresponding pivot and extending on both sides of said arm, means disposed between the parts of said levers extending on one side of said arms and adapted to oppose the relative movement of said levers in one direction, and means disposed between the parts of said levers extending on the other side of said arms and adapted to oppose the relative movement of said levers in the other direction.

EUGÈNE PROSPER RENAUX.